(12) United States Patent
Lear et al.

(10) Patent No.: US 10,547,503 B2
(45) Date of Patent: Jan. 28, 2020

(54) NETWORK CONNECTED DEVICE USAGE PROFILE MANAGEMENT

(71) Applicant: Cisco Technology, Inc., San Jose, CA (US)

(72) Inventors: Eliot Lear, Wetzikon (CH); Nancy Cam-Winget, Mountain View, CA (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 15/007,859

(22) Filed: Jan. 27, 2016

(65) Prior Publication Data
US 2017/0033984 A1     Feb. 2, 2017

Related U.S. Application Data

(60) Provisional application No. 62/198,782, filed on Jul. 30, 2015.

(51) Int. Cl.
*H04L 12/24*     (2006.01)
*H04L 29/08*     (2006.01)

(52) U.S. Cl.
CPC ...... *H04L 41/0803* (2013.01); *H04L 41/0893* (2013.01); *H04L 67/12* (2013.01); *H04L 67/303* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 9,208,295 B2 | 12/2015 | Cam-Winget et al. | |
| 2003/0140131 A1* | 7/2003 | Chandrashekhar | ........................ H04L 12/4641 709/223 |
| 2014/0201212 A1* | 7/2014 | Qi | ........................ H04L 67/303 707/741 |
| 2014/0244833 A1* | 8/2014 | Sharma | .................. H04L 67/16 709/224 |

(Continued)

FOREIGN PATENT DOCUMENTS

WO     2013123445 A1     8/2013

OTHER PUBLICATIONS

IEEE Computer Society, "Secure Device Identity", IEEE Std 802.1AR, Dec. 22, 2009, 77 pages.

(Continued)

*Primary Examiner* — Thomas J Dailey
(74) *Attorney, Agent, or Firm* — Edell, Shapiro & Finnan, LLC

(57) ABSTRACT

Presented herein are techniques in which one or more network devices can use information provided by a special purpose network connected device to retrieve a usage profile (i.e., configuration file) associated with the special purpose network connected device. The retrieved usage profile, which includes/describes preselected (predetermined) usage descriptions associated with the special purpose network connected device, can then be used to configure one or more network devices. For example, the predetermined usage descriptions associated with the special purpose network connected device can be instantiated and enforced at a network device or the predetermined usage descriptions can be used for auditing the special purpose network connected device (e.g., monitoring of traffic within the network).

20 Claims, 9 Drawing Sheets

(56) References Cited

U.S. PATENT DOCUMENTS

| | | | |
|---|---|---|---|
| 2014/0289366 A1* | 9/2014 | Choi | G06F 9/4451 709/218 |
| 2014/0365512 A1 | 12/2014 | Thomson et al. | |
| 2015/0019710 A1* | 1/2015 | Shaashua | H04W 4/70 709/224 |
| 2015/0135260 A1 | 5/2015 | Ilyadis et al. | |
| 2015/0249672 A1* | 9/2015 | Burns | H04L 12/66 726/4 |
| 2015/0358777 A1* | 12/2015 | Gupta | H04L 12/2807 370/254 |
| 2016/0041534 A1* | 2/2016 | Gupta | G05B 13/0265 700/275 |
| 2016/0044032 A1* | 2/2016 | Kim | H04L 63/0876 726/5 |
| 2016/0128043 A1* | 5/2016 | Shuman | H04W 72/044 370/331 |
| 2016/0156614 A1* | 6/2016 | Jain | H04L 63/0876 726/6 |
| 2016/0205078 A1* | 7/2016 | James | H04L 63/0442 713/171 |
| 2016/0381030 A1* | 12/2016 | Chillappa | H04L 63/102 726/11 |

OTHER PUBLICATIONS

Cisco Systems, Inc., "Cisco Discovery Protocol Configuration Guide, Cisco IOS Release 15M&T", https://www.cisco.com/c/en/us/td/docs/ios-xml/ios/cdp/configuration/15-mt/cdp-15-mt-book/nm-cdp-discover.html, Jun. 3, 2016, 38 pages.

D. Bogdanovic et al., "Network Access Control List (ACL) YANG Data Model", draft-ietf-netmod-acl-model-02, NETMOD WG, Internet-Draft, Intended status: Standards Track, Mar. 5, 2015, 27 pages.

A. Sullivan et al., "DBOUND: DNS Administrative Boundaries Problem Statement", draft-sullivan-dbound-problem-statement-02, DBOUND, Internet-Draft, Intended status: Standards Track, Feb. 18, 2016, 10 pages.

Deben, "Link Layer Discovery Protocol (LLDP)", Apr. 28, 2015, 5 pages.

Mozilla Foundation. , "Public Suffix List", Learn more about the Public Suffix List , https://publicsuffix.org/learn/, downloaded Mar. 29, 2019, 3 pages.

P. Sangster et al., "Network Endpoint Assessment (NEA): Overview and Requirements", Network Working Group, Request for Comments: 5209, Category: Informational, Jun. 2008, 53 pages.

D. Cooper et al., "Internet X.509 Public Key Infrastructure Certificate and Certificate Revocation List (CRL) Profile", Network Working Group, Request for Comments: 5280, Category: Standards Track, May 2008, 151 pages.

S. Cheshire et al., "DNS-Based Service Discovery", Internet Engineering Task Force (IETF), Request for Comments: 6763, Category: Standards Track, ISSN: 2070-1721, Feb. 2013, 49 pages.

D. Wing, Ed. et al., "Port Control Protocol (PCP)", Internet Engineering Task Force (IETF), Request for Comments: 6887, Category: Standards Track, ISSN: 2070-1721, Apr. 2013, 88 pages.

* cited by examiner

```
<require>
<dns-service/>
</require>
<access-lists>
<access-list>
<access-list-name>profiles.cloud.example.com access
</access-list-name>
<rule-name>pcel</rule-name>
<matches>
<destination-ipv4-network>10.1.58.2/32</destination-ipv4-network>
</matches>
<actions><permit /></actions>
</rule-name>
</access-list>
</access-lists>
```

FIG.3

NETWORK CONNECTED DEVICE USAGE PROFILE MANAGEMENT

RELATED APPLICATIONS

This application claims priority to U.S. Provisional Patent Application No. 62/198,782 filed Jul. 30, 2015, entitled "IOT METHOD TO CREATE AND AUDIT CAPABILITIES FOR MANUFACTURER-DRIVEN NETWORK POLICY," the entirety of which is hereby incorporated by reference herein.

TECHNICAL FIELD

The present disclosure relates to usage descriptions for network connected devices.

BACKGROUND

The Internet of Things (IoT) is a general term used to describe the addition of networking capabilities to physical objects or "things" that serve some purpose or function outside of computing and/or networking technologies (i.e., traditionally "unconnected" or "offline" devices). In general, these "things," sometimes referred to as IoT enabled-devices, IoT devices, or special purpose network connected devices, are embedded with electronics, software, and network interfaces, which enables the physical objects to send and/or receive data packets over a network.

The rapid rise of IoT has resulted in steadily increasing numbers and types of special purpose network connected devices. It is possible that many of these special purpose network connected devices will have little or no associated security capabilities (e.g., no authorization, authentication, and/or encryption capabilities) and, as such, there is a risk of such devices being attacked by a malicious entity. For example, an IoT-enabled refrigerator may have no need to send email, but yet refrigerators can be attacked and used to generate spam and malware.

BRIEF DESCRIPTION OF THE DRAWINGS

FIG. 3 is a schematic diagram illustrating a usage profile for a network connected device, according to an example embodiment.

DESCRIPTION OF EXAMPLE EMBODIMENTS

Overview

Presented herein are techniques in which one or more network devices in a network infrastructure can use information provided by a special purpose network connected device to retrieve a usage profile, such as a configuration profile or template, associated with the special purpose network connected device. The retrieved usage profile, which includes/identifies (i.e., includes, describes, and/or references) preselected (predetermined) usage descriptions associated with the special purpose network connected device, can then be used to configure one or more network devices. For example, the usage descriptions may include predetermined usage descriptions associated with the special purpose network connected device which can be instantiated and enforced at a network device or the predetermined usage descriptions can be used for auditing the network connected device (e.g., monitoring of traffic within the network).

Example Embodiments

Certain special purpose network connected devices, sometimes referred to as IoT enabled-devices (IoT devices), require only limited network exposure, such as access to a specific service or controller. However, other special purpose network connected devices may require access to other types of devices on the network. When a special purpose network connected device is overly exposed, there is a risk of that device being maliciously attacked. Consequently, it is important to identify properties of special purpose network connected devices to determine what access they should be allowed and what other network capabilities may be required, such as preferred treatment of packets flowing to or from such devices. There is also a need to determine whether special purpose network connected devices with limited capabilities are following the intended use of a manufacturer.

Figure 1:
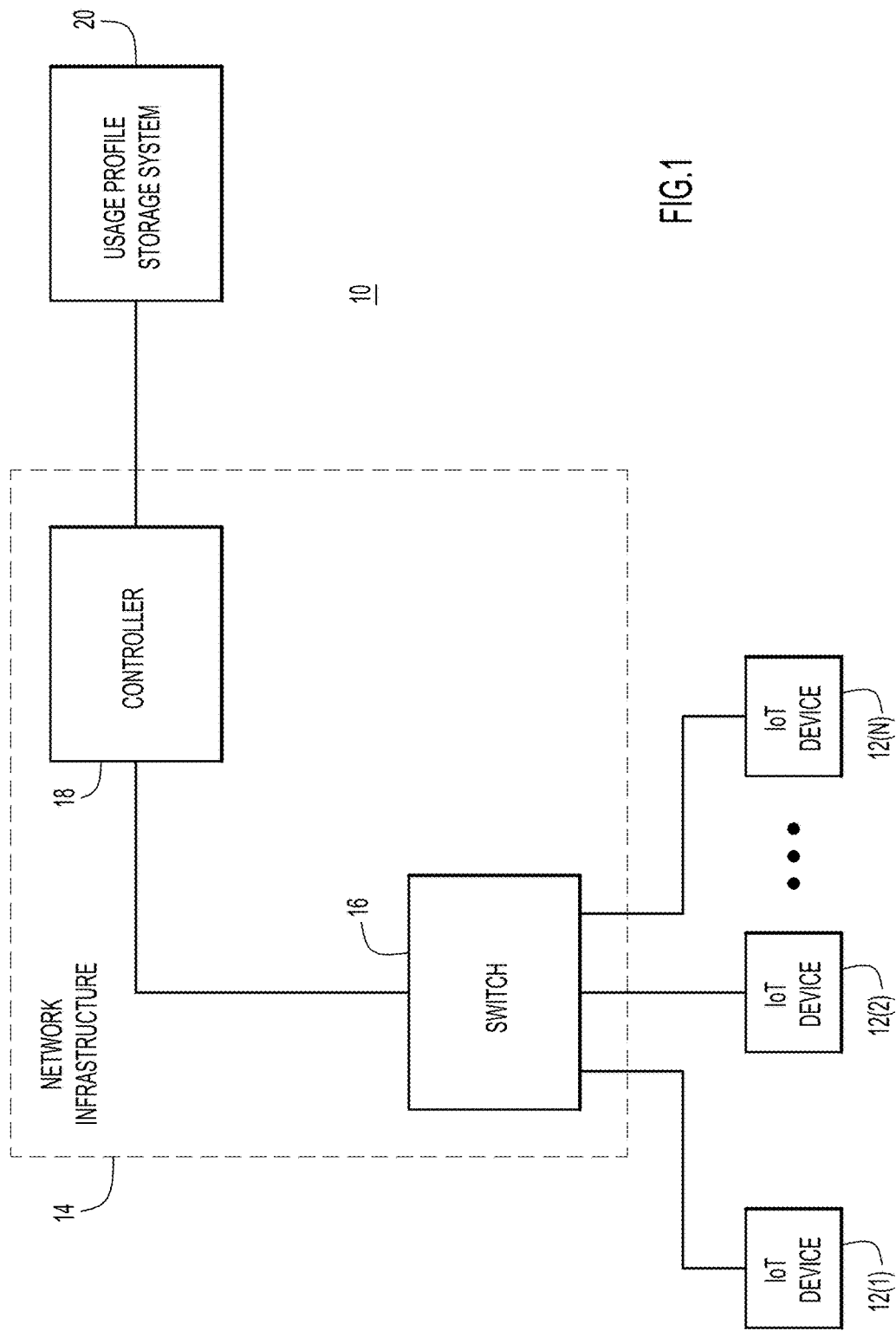
FIG. 1 is a block diagram of a network in which a network device is configured to retrieve usage profiles associated with special purpose network connected devices, according to an example embodiment.

Reference is first made to FIG. 1 that illustrates a network 10 comprising a plurality of special purpose network connected devices 12(1)-12(N), which are sometimes referred to herein as IoT enabled-devices or simply IoT devices. As used herein, special purpose network connected devices (IoT devices) are physical things or objects that serve a single purpose or function or a small number of purposes or functions, such as refrigerators, thermostats, light fixtures, etc. In special purpose network connected devices, computing and/or networking functions are only ancillary/supplemental to the primary purpose/function of the device. For a variety of reasons, such as costs or device age, special purpose network connected devices may have limited computing and/or networking capabilities. For example, the IoT devices 12(1)-12(N) may not have sufficient capabilities to safely encrypt or decrypt sent/received messages, etc. In general, special purpose network connected devices are devices that typically do not require human interaction for the device to connect/communicate with other devices via a machine-to-machine mechanism.

Network 10 also includes a network infrastructure 14 formed by a plurality of network devices (network nodes) that, in the example of FIG. 1, include a switch 16 and a controller (e.g., firewall) 18. Network 10 further includes a usage profile storage system 20 that is connected to the controller 18. The usage profile storage system 20 includes one or more devices (e.g., servers) that, as described further below, are configured to store "usage profiles" associated with the IoT devices 12(1)-12(N). In general, the usage profiles are configuration profiles or templates each associated with one or more IoT devices 12(1)-12(N). The usage profiles each identify (i.e., include, describe, and/or reference) preselected (predetermined) usage descriptions associated with the respective IoT device. The usage descriptions comprise information that affects how to configure networking policies across the network infrastructure 14 (i.e., information that can be used by the network infrastructure to determine the appropriate usage, role, policies, etc. for the IoT devices).

A number of different usage descriptions may be set for the corresponding IoT device 12(1). These usage descriptions may include, for example, description of the role of the IoT device, access control policies, quality of service (QoS) policies (e.g., traffic prioritization), signature-based policies (e.g., SIP type of signatures), indication of network required services (e.g., web/Transport Layer Security (TLS) proxy functions, malware scanning, Domain Name System (DNS), network authentication, etc.), protocol usage restrictions, application (type) restrictions, and/or other policies. In certain examples, groups of statements may be conditioned on options found in the URI.

In certain examples, the predetermined usage descriptions are referred to herein as being "manufacturer-driven" or "manufacturer-based" usage descriptions because they may indicate the manufacturer's operational requirements and/or intent for the corresponding special purpose network connected device. For instance, the IoT device 12(1) may be thermostat device that, according to the manufacturer may only need to contact its controller, which it knows by a hostname. As such, the manufacturer sets access control policy information indicating that the thermostat device can only communicate with its associated controller. In such examples, the manufacturer-based usage descriptions are used to configure switch 16 so as to perform access control mechanisms to enforce this policy (i.e., monitoring Domain Name Server (DNS) queries and responses, and applying appropriate access rules to limit communications between the IoT 12(1) and the corresponding controller).

In one example, the usage profile storage system 20 is part of a website (e.g., a webpage) associated with a manufacturer of an IoT device. The network devices within network infrastructure 14 may form a local area network (LAN) and usage profile storage system 20 is a remote system connected to the controller 18 and/or the switch 16 via a wide area network (WAN), such as the Internet. In other examples, the usage profile storage system 20 is a local system that is directly connected to one of the network devices in the network infrastructure 14.

Figure 2:
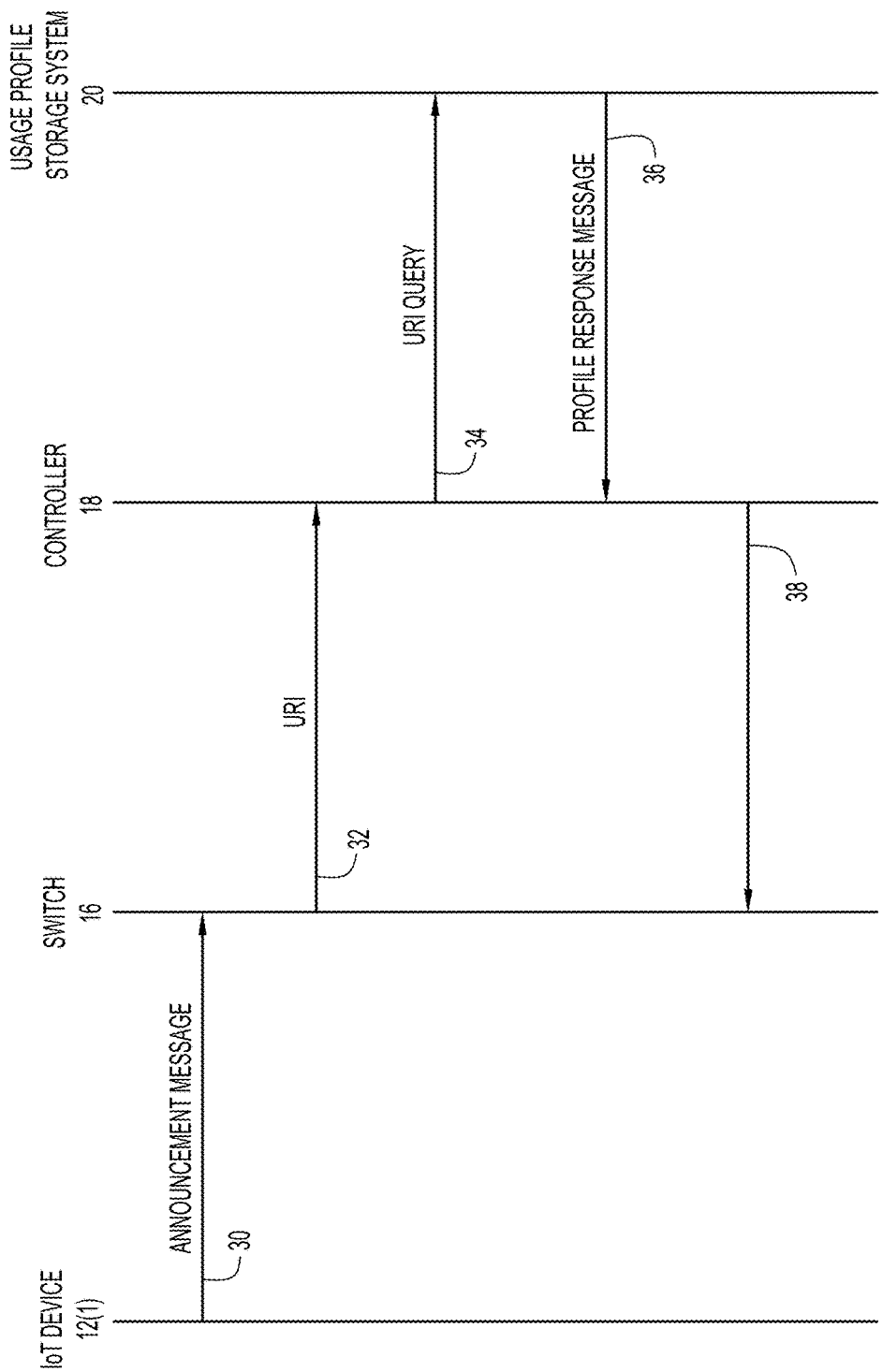
FIG. 2 is a ladder diagram illustrating a flow of information to retrieve and instantiate usage descriptions for a special purpose network connected device, according to an example embodiment.

FIG. 2 is a ladder diagram illustrating the retrieval and establishment of predetermined usage descriptions associated with a special purpose network connected device in accordance with examples presented herein. For ease of illustration, FIG. 2 is described with reference to network 10 of FIG. 1 and, more particularly, with reference to the retrieval and establishment of usage descriptions for IoT device 12(1).

As noted above, IoT devices are physical things or objects that serve a single purpose or function or a small number of purposes or functions, such as refrigerators, thermostats, light fixtures, etc. For a variety of reasons, such as costs or device age, IoT devices 12(1)-12(N) may have limited computing and/or networking capabilities. For example, the IoT devices 12(1)-12(N) may not have sufficient capabilities to safely encrypt or decrypt sent/received messages, etc. As such, the techniques presented herein minimize the resources needed for an IoT device 12(1)-12(N) to identify itself to the network infrastructure 14. The techniques presented herein also allow the network infrastructure to identify and retrieve predetermined usage descriptions associated with an IoT device 12(1)-12(N), without requiring the corresponding IoT device to provide the actual usage descriptions to the network infrastructure.

More specifically, as shown in FIG. 2, IoT device 12(1) first sends an announcement message to the switch 16. This announcement message, which is represented in FIG. 2 by arrow 30, includes an indirect reference/pointer to a usage profile associated with the IoT device 12(1). In other words, the IoT device 12(1) does not send out the actual predetermined usage descriptions associated with the IoT device 12(1), but instead sends information that abstractly/indirectly references (i.e., points to) a usage profile that includes the actual predetermined usage descriptions associated with the IoT device 12(1).

In the example of FIG. 2, the indirect reference included in the announcement message 30 is a Uniform Resource Identifier (URI). A URI is a unique string of characters used to identify the name and location of a file or resource. A URI may comprise a string of characters for the filename and may also contain the path to the directory of the file. As such, the URI included in the announcement message 30 identifies the name and location of the usage profile associated with IoT device 12(1).

The announcement message 30, which may be a broadcast message, may have a number of different forms. For example, the URI may be included as an additional discovery protocol attribute, such as a Cisco Discovery Protocol (CDP) or Link Layer Discovery Protocol (LLDP) attribute, or a Dynamic Host Configuration Protocol (DHCP) option, that indicates a profile name that is specified by its manufacturer. In addition to, or instead of CDP or LLDP, the IoT device 12(1) can send the URI via an X.509 certificate extension as part of Institute of Electrical and Electronics Engineers (IEEE) 802.1AR via IEEE 802.1X.

In the example of FIG. 2, the announcement message 30 is received at the switch 16. The switch 16 may extract the URI from the announcement message 30 and send the URI to the controller 16 via, for example, Hyper Text Transfer Protocol Secure (HTTPS). In FIG. 2, arrow 32 is used to represent the extracted URI as it is sent from the switch 16 to the controller 18.

The controller 18 is configured to resolve the URI 32 received from the switch 16 and use the URI to retrieve the usage profile associated with the IoT device 12(1). That is, the controller 18 sends a URI query, which is represented in FIG. 2 by arrow 34, to the usage profile storage system 20. The URI query 34 is a request for the usage profile storage system 20 to send the usage profile associated with the IoT device 12(1) back to the controller 18. As such, upon receipt of the URI query 34, the usage profile storage system 20 sends a profile response message, which is represented in FIG. 2 by arrow 36, to the controller 18. The profile response message 36 includes the usage profile for IoT device 12(1)

with IoT device 12(1)). In one example, the URI query 34 and the profile response message 36 are sent via HTTPS.

As noted above, a usage profile for an IoT device each identify (i.e., include, describe, and/or reference) preselected usage descriptions associated with the respective IoT device. A usage profile may include the usage description or refer to (imply) the usage description. For example, a usage profile may not necessarily state the ACL or QoS information associated with an IoT, but rather the usage profile includes information used to guide the appropriate access controls in the various parts of the network infrastructure. In other words, the usage descriptions include information understood by the controller so that the controller can provide the appropriate configuration (access policies) to other network devices in the network infrastructure.

Once the usage profile is received by the controller 18, the controller is configured to extract one or more predetermined usage descriptions associated with the IoT device 12(1) from the retrieved usage profile. These one or more predetermined usage descriptions may then be converted by the controller to configuration that is appropriate for the switch 16. That is, the predetermined usage descriptions identified within the usage profile are installed and may be associated with an identifier (such as a Media Access Control (MAC) address) of the IoT device 12(1).

Operation of the switch 16 is also configured based on the one or more predetermined usage descriptions included in the usage profile. More specifically, as represented by arrow 38 in FIG. 2, the one or more predetermined usage descriptions identified within the usage profile are sent from the controller 18 to the switch 16 where the one or more usage descriptions are also instantiated. Once the one or more predetermined usage descriptions identified within the usage profile (i.e., the policies associated with IoT device 12(1)) are processed by the controller 18 and installed in the switch 16, the predetermined usage descriptions associated with the IoT device 12(1) may be enforced by the network infrastructure 14. In other words, using the one or more predetermined usage descriptions extracted from the retrieved usage profile, the switch 16 is configured to enforce the one or more usage descriptions on packets (traffic) sent by, or directed to, the IoT device 12(1).

In one example, the usage profile retrieved from the usage profile storage system 20 is an Extensible Markup Language (XML) file that is modified to include the predetermined network policy information (policies) and that can support basic statements regarding Internet Protocol (IP) addresses, Transport Control Protocol (TCP) ports, and Media Access Control (MAC) addresses. In addition, more abstract filter and access parameters may be defined. These additional parameters may include, for example, a "local" parameter (i.e., indicating the local network), a "same-model" parameter (i.e., indicating devices with of the same manufacturer and model), a "same-manufacturer" parameter (i.e., indicating devices made by the manufacturer), a "manufacturer" parameter (i.e., indicating devices made by another manufacturer, based on the authority section of the URI) and a "my-controller" parameter (i.e., indicating one or more network management stations that are resolved locally through information either configured by the network administrator or learned by the network)."

To instantiate a policy of "same-manufacturer" as a filter, access-lists are created based on the Internet Protocol (IP) address of all IoT devices that use the same authority of the URI. The policy of "local" is instantiated by the network as not using the default route by default, but this may be overridden in the enterprise environment, particularly for branches that are always using default. In those cases, a network administrator would define the scope of default by a prefix-based access-list.

In general, a URI is set at manufacturing so as to reference (point) to a specific usage profile and the URI is then stored in the corresponding IoT device. Depending on a number of different factors, the URI may be hardcoded into the IoT device, stored as firmware, or stored as software. In certain examples, the URI provided by the manufacturer is sufficient and may be used, as described above, to configure network devices for operation with an IoT device. However, in another example, the URI is referred to as being "configurable" in that the URI (and the associated predetermined usage descriptions) may be altered before the IoT device is connected to a network. That is, it is possible for the URI and predetermined usage descriptions to be customized for a specific customer, type of customer, etc. (e.g., a network administrator can customize the usage descriptions for an IoT device in accordance with the associated network needs). Following such customization, an original URI set by the manufacturer points to a usage profile with incorrect network policy information for the customized IoT device. As a result, the network administrator or another entity may have the ability to store a new URI in the IoT device that points to an updated usage profile (stored in a usage profile storage system) with the customized usage descriptions.

In certain examples, additional authorization or authentication checks may be performed and only the union of the allowed access is provided. The URI associated with an IoT device identifier (such as a MAC address) is stored so that once a device type is determined it cannot be changed, although version information may change. The usage profile associated with an URI may be locally cached at the controller 18. Therefore, if there are multiple IoT devices using the same profile, only a single query to the usage profile storage system 20 is needed and the controller 18 can utilize a locally cached usage profile to service future profile requests.

As noted above, in one example the IoT device 12(1) may be a thermostat device. Continuing with this specific example, the thermostat device is, more particularly, a thermostat manufactured by a company named "ExampleThermostat," is identified as model number 2, and runs version three (3) of the ExampleThermostat operating system (OS). In this example, the IoT device 12(1) needs access to a cloud-based controller at the domain "examplethermostat.cloud.com." As such, when powered up, the thermostat device emits an announcement message (e.g., LLDP message) with a Type Length Value (TLV) that includes the following URI:
https://profiles.examplethermostat.cloud..com/.well-known/
mud/examplethermostat/model2/
ExampleThermostatOS3#SmartGrid=False Once this announcement message is received at the switch 16, the URI is forwarded to the controller 18 for resolution. Using the URI, the controller 18 requests the usage profile from the usage profile storage system 20 (in this example, one or more services associated with the domain examplethermostat.cloud.com) and receives a usage profile for the thermostat device.

FIG. 3 is a schematic diagram illustrating a portion of a usage profile 50 set for the thermostat device manufactured by ExampleThermostat in the above example. In FIG. 3, the "require" line, identified by reference number 52, provides an implicit permit for the name server that would be returned via DHCP to the thermostat device.

Merely for ease of illustration, FIGS. 1, 2, and 3 have been described with reference to controller 18 as the network device that retrieves a usage profile with usage descriptions for instantiation at controller 18 and/or switch 16. However, it is to be appreciated that the controller 18 may be omitted in alternative examples and the switch 16 and/or other network devices may communicate directly with the usage profile storage system 20 to retrieve and instantiate usage descriptions for an IoT device.

The above examples also illustrate the retrieval of the usage profile associated with an IoT device using a URI provided by the IoT device. It is to be appreciated that the URI is an example of an indirect reference/pointer that may be used to retrieve usage descriptions (e.g., network policy information) for a special purpose network connected device. For example, in an alternative arrangement, it may be possible to use the identity of a special purpose network connected device as the indirect reference/pointer that may be used to retrieve usage descriptions. In such examples, the announcement message includes the identity of the corresponding special purpose network connected device (i.e., the device that transmitted the message) and a network device is configured to use this identity to resolve the URI without the need for the URI to actually be supplied by the IoT device.

Furthermore, it is possible that the URI associated with a special purpose network connected device may be itself used as a classifier/identifier for the special purpose network connected device. In such examples, the infrastructure (e.g., controller) may have its own store of the information which is accessed based on the received URI. Alternatively, the URI identifier could be used create usage descriptions for the IoT device based on or more predetermined rules/criteria. That is, the URI itself is used solely to identify the device to the network infrastructure as a classifier, where a network administrator may then configure access policies appropriate for his or her network, based on that classifier.

Using the above thermostat case as an example, several usage descriptions can be generated based on the URI identifier as well as other information to which a network device within a network infrastructure may have access. For example, the URI identifier may indicate the manufacturer of the thermostat and that information, coupled with another policy that states "M2M devices are restricted from the data center" would then result in a policy that restricts the communication path of the thermostat such that its network routing path is restricted/blocked from reaching the data center. In using a URI that comes from the manufacturer (e.g., determined through string pattern match), then the device can be classified as an M2M device where their QoS classification can be downgraded or improved.

Figure 4:
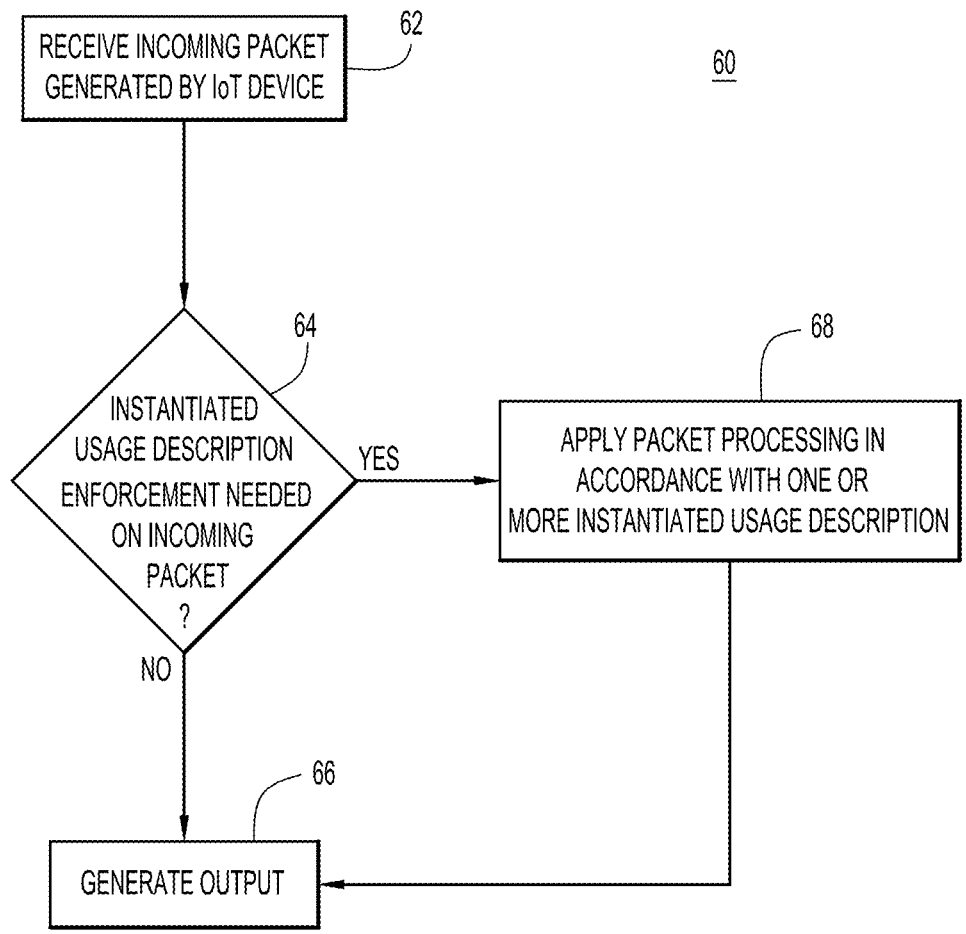
FIG. 4 is a flowchart illustrating a process running in a network device in accordance with retrieved usage descriptions, according to an example embodiment.

FIG. 4 is flowchart illustrating a method 60 for the enforcement of instantiated usage descriptions in accordance with examples presented herein. For ease of illustration, the method of FIG. 4 is described with reference to the arrangement of FIG. 1. The method of FIG. 4 is implemented after the usage descriptions are retrieved, as described above, based on information transmitted by IoT device 12(1).

Method 60 begins at 62 where a packet generated by IoT device 12(1) is received at switch 16. That is, a network device that has been configured (as described above) to enforce predetermined usage descriptions for the IoT device 12(1) receives an incoming packet generated by the IoT device. At 64, the switch 16 determines whether or not one or more of the instantiated usage descriptions apply to the incoming packet. In none of the instantiated usage descriptions apply, then at 66 the switch 16 generates an output based on the incoming packet.

Returning to 64, if the switch 16 determines that one or more of the instantiated usage descriptions apply to the incoming packet, then at 68 packet processing/conditioning is applied in accordance with the one or more instantiated usage descriptions. As noted above, the usage profile for an IoT device may describe a variety of different types of usage descriptions (e.g., access control policies, quality of service policies, etc.). As such, the packet processing at 68 also take a number of different forms to generate a processed packet. After the packet processing, an output may be generated at 66 using the processed packet generated at 68.

To summarize the examples of FIGS. 1-4, the techniques presented herein make use of service discovery, a profile storage system (e.g., manufacturer website), a stored usage profile (i.e., configuration file), and a network device to impose predetermined usage descriptions specified, for example, by the manufacturer of the IoT device. The above techniques may compliment existing policy mechanisms, and can be used to limit exposure to the Internet at the manufacturer's request. In addition, access can be granted based on device type, operating system, and version, as declared by the manufacturer The above techniques may also provide an authoritative policy intent for an IoT device in a manner that is superior to, for example, existing methods such as the Port Control Protocol (PCP). For example, PCP is required to be run on the IoT device itself, whereas the techniques presented herein only require that the IoT device to emit an indirect reference (e.g., URI) to usage descriptions. Furthermore, whereas PCP is used by a IoT device to open a pinhole to a firewall, this method provides, for example, a mechanism for a network to limit connectivity for the IoT device.

The above techniques may also provide a mechanism for the network to allow communications to IoT devices from the same manufacturer, or even those using the same version, which is a capability that is not supported by existing techniques. For example, conventional techniques may allow IoT devices to attempt communication only with their corresponding IoT controllers, but vulnerabilities may be present. The techniques presented herein provide an additional layer of protection so that only the services the manufacturer intends for the corresponding IoT device are accessed. That is, enterprises may use the techniques presented herein to limit access of IoT devices to only those components of the network that the manufacturer of the device intends. As such, IoT manufacturers can limit their exposure to network threats by requesting that the network only permit desired access, such as to a controller, or to devices of the same type.

The examples of FIGS. 1-4 illustrate techniques in which usage descriptions associated with a special purpose network connected device are retrieved as part of a usage profile and are then instantiated and subsequently enforced by one or more network devices within a network infrastructure. In certain examples, there is a need to determine whether special purpose network connected devices with limited capabilities (e.g., IoT devices) are in compliance with a predetermined intended use that is selected, for example, by the device manufacturer. For example, it may be desirable to enable network administrators to determine, for instance, that a smart light bulb is using a predetermined controller or is communicating with predetermined automation systems, as designed, rather than sending spam message. As such, the techniques presented herein enable network devices to retrieve and instantiate usage descriptions associated with IoT devices for auditing operations. That is, in certain examples, the policies retrieved as part of a usage profile are not enforced by the network, but instead are used only for auditing packets sent by one or more selected IoT devices. Therefore, the techniques presented herein provide a mechanism to audit a network based on predetermined policies, such as manufacturer-based policies, associated with special purpose network connected devices. Auditing operations may be combined with other monitoring/inspection methods.

Figure 5:
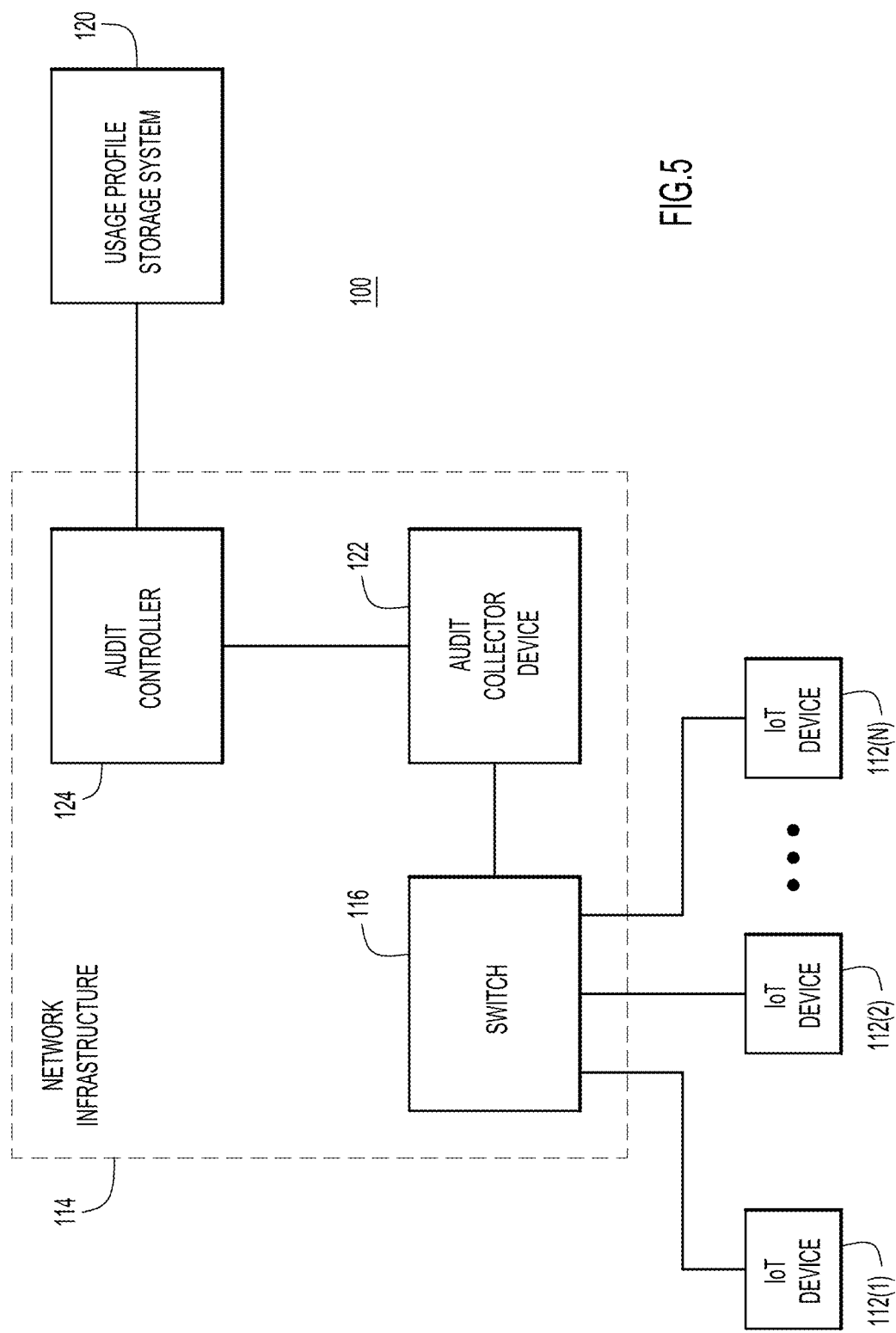
FIG. 5 is a block diagram of a network in which a network device is configured to retrieve usage profiles associated with special purpose network connected devices and perform auditing operations, according to an example embodiment.

More specifically, reference is now made to FIG. 5 which illustrates a network 100 that is configured to perform auditing operations in accordance with examples presented herein. Network 100 includes a plurality of special purpose network connected devices 112(1)-112(N), which are sometimes referred to herein as IoT enabled-devices or simply IoT devices, a network infrastructure 114 formed by a plurality of network devices, and a usage profile storage system 120. In the example of FIG. 5, the network infrastructure 114 includes a switch 116, an audit collector device 122, and an audit controller 124. The usage profile storage system 120 includes one or devices (e.g., servers) that are configured to store usage descriptions for the IoT devices 112(1)-112(N). In one example, the network nodes within network infrastructure 114 form a LAN and the usage profile storage system 120 is a remote system connected to the controller 124 via a WAN. In other examples, the usage profile storage system 120 is a local system that is directly connected to one of the network nodes in the network infrastructure 114.

Figure 6:
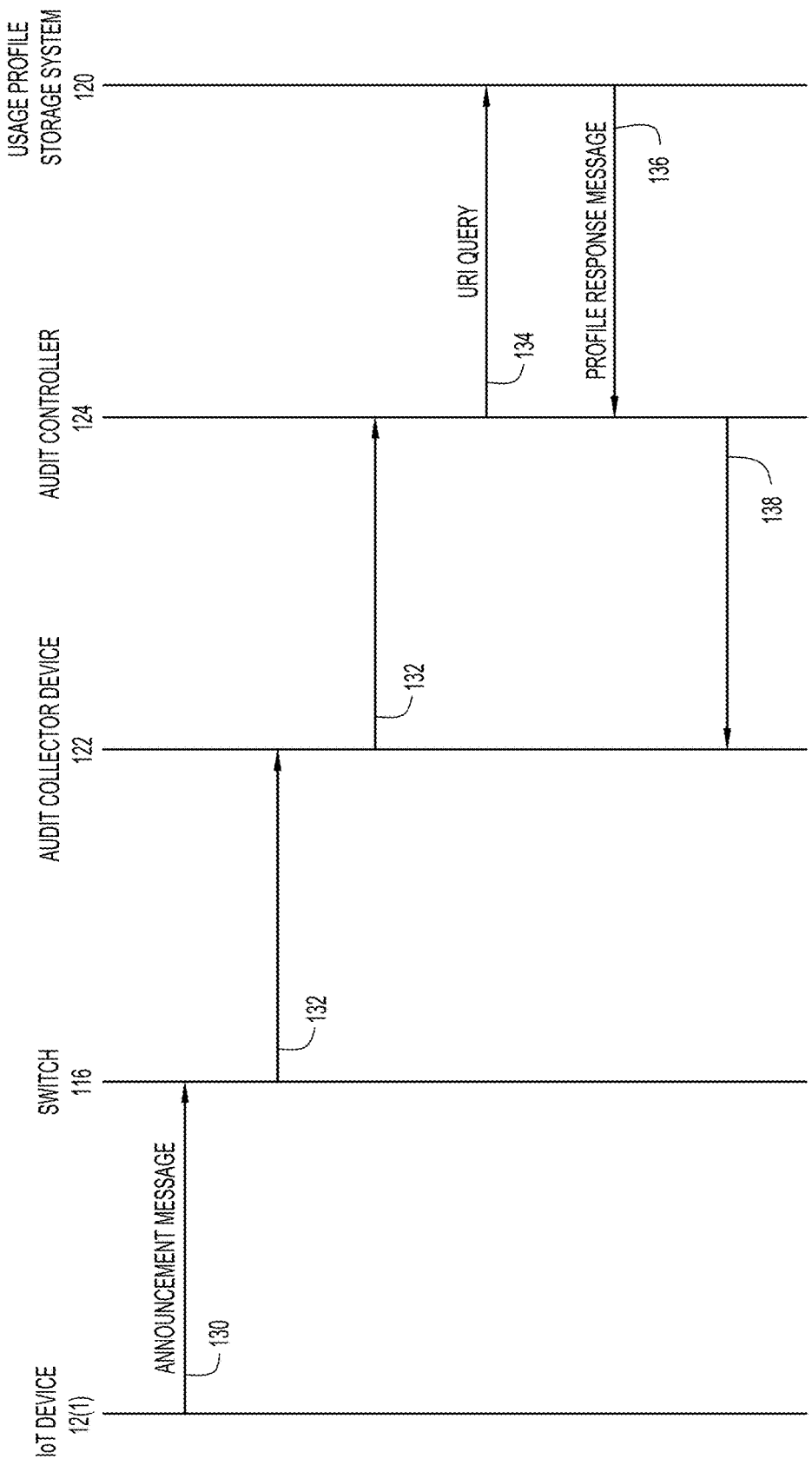
FIG. 6 is a ladder diagram illustrating a flow of information to retrieve and instantiate usage descriptions for auditing a special purpose network connected device, according to an example embodiment.

FIG. 6 is a ladder diagram illustrating techniques for configuring a network device with predetermined usage descriptions associated with a special purpose network connected device for auditing operations in accordance with examples presented herein. For ease of illustration, FIG. 6 is described with reference to network 100 of FIG. 5 and, more particularly, with reference to the establishment of auditing IoT device 112(1) (i.e., performing auditing functions for traffic associated with IoT device 112(1)).

Similar to the example of FIG. 2, the IoT device 112(1) is configured to send (e.g., broadcast) an announcement message that is received at the switch 116. This announcement message, which is represented in FIG. 6 by arrow 130, includes an indirect reference/pointer to a usage profile associated with the corresponding IoT device (i.e., includes information that indirectly references a usage descriptions associated with IoT device 112(1)). In the example of FIG. 6 the reference/pointer included in the announcement message 130 is a URI that identifies the name and location of the usage profile associated with the IoT device 112(1) (i.e., the that sent the corresponding announcement message).

Similar to the example of FIG. 2, the announcement message 130, which may be a broadcast message, may have a number of different forms. For example, the URI may be included as an additional discovery protocol attribute, such as a CDP or LLDP attribute, or a DHCP option, that indicates a profile name that is specified by its manufacturer. In addition to CDP or LLDP, the IEEE 802.1AR may be used to communicate a certificate with an extension that contains the URI. When either LLDP or DHCP and IEEE 802.1AR are used, the URI from IEEE 802.1AR may be preferred.

Returning to FIG. 5, through the use of, for example, passive observation, a set of spanned ports (i.e., where a copy of traffic is sent for monitoring purposes), etc., the announcement message 130 (e.g., LLDP announcements of TLVs or DHCP requests with client-side options that contain manufacturer policy URIs) or only the URIs within the announcement message 130 is obtained by the audit collector device 122 and reported to the audit controller 124. The transfer of at least the URIs from the switch 116 to the audit collector device 122 and then subsequently to the audit controller 124 is represented in FIG. 6 by arrows 132.

The audit controller 124 is configured to resolve the received URI 132 and use the URI to retrieve the usage profile associated with the IoT device 112(1). That is, the audit controller 124 sends a URI query, which is represented in FIG. 6 by arrow 134, to the usage profile storage system 120. The URI query 134 is a request for the usage profile storage system 120 to send the usage profile associated with the IoT device 112(1) back to the audit controller 124. As such, upon receipt of the URI query 134, the usage profile storage system 120 sends a profile response message, which is represented in FIG. 6 by arrow 136, to the audit controller 124. The profile response message 136 includes the usage profile for IoT device 112(1) (i.e., a description of the usage descriptions associated with IoT device 112(1)). In one example, the URI query 134 and the profile response message 136 are sent via HTTPS.

Once the usage profile is received by the audit controller 124, the audit controller extracts one or more usage descriptions from the usage profile. The audit controller 124 then instantiates the usage descriptions described therein at the audit controller. That is, the usage descriptions (e.g., network policies) identified within the usage profile are installed and associated with an identifier (such as a MAC address) of the IoT device 112(1). The usage descriptions identified within the usage profile are then used to configure the audit collector device 122 to perform auditing operations for packets/traffic associated with (i.e., sent by or directed to) the IoT device 112(1). More specifically, auditing controller 124 transmits (e.g., via XMPP/Cisco Platform Exchange Grid (pxGrid) or Network Configuration Protocol (NETCONF)) appropriate auditing rules to the audit collector device 122. Alternatively, the audit controller 124 transmits the usage descriptions to the audit collector device 122 and the audit collector device instantiates the appropriate auditing rules. Transfer of the auditing rules and/or the usage descriptions from the audit controller 124 to the audit collector device 122 is represented in FIG. 6 by arrow 138.

In general, the auditing rules specify various operations that are to be performed by the audit collector device 122 on traffic associated with the IoT device 112(1). For example, the auditing rules cause the audit collector device 122 to monitor the traffic sent by the IoT device 112(1) for policy violations and, when a violation is uncovered, perform one or more additional operations. These additional operations may include statistical counting operations, triggering of alarms, etc.

In certain examples, the auditing rules may be interpreted such that the definitions are expanded to include: "Local traffic," which is defined by the network administrator, or in absence of that definition, as traffic not requiring use of the default route; "Same manufacturer" is defined as any device that has associated with it the same authority section of their manufacturer policy URI as that which was emitted by a given node, and "Manufacturer," which is the authority section of the manufacturer policy URI emitted by a given node. In each of these cases, a table is maintained that maps the source device identifier (such as a MAC address) on the announcement message to device manufacturer. The audit collector device 122 then proceeds to monitor/observe traffic and apply the auditing rules thereto. That is, the audit collector device 122 is configured to monitor traffic sent by the IoT device 12(1) and to determine if the traffic violates the auditing rules. If violations are detected by the audit collector device 122, then the violations are reported (e.g., via XMPP/pxGrid or through some other means such as SYSLOG) to the audit controller 124, and possibly to other configured devices.

It is to be appreciated that the examples of FIGS. 1-4 and 5-6 are not mutually exclusive and may be used in concert. For example, the techniques described above with reference to FIGS. 1-4 may be used to configure a network device to enforce usage descriptions and the techniques described above with reference to FIGS. 5-6 may be used to ensure that the network device is properly enforcing the usage descriptions (i.e., that the network device has properly implemented the configuration as provided by the manufacturer).

It may not be possible for all networks to implement predetermined usage descriptions, such as manufacturer-based usage descriptions, associated with special purpose network connected devices. As such, the examples of FIGS. 5 and 6 provide techniques to use the predetermined usage descriptions as an input for auditing special purpose network connected devices. In the examples presented herein, the auditing operations may specifically examine the intent of the manufacturer by retrieving usage descriptions based on a URI that the special purpose network connected device emits and then auditing against that specific intent. The auditing techniques may be used in concert with other auditing approaches, but are intended to identify specific IoT devices that are not behaving on the network as they were intended, thus highlighting potential security problems. Specifically, if an IoT device is accessible to a broad number of devices and is in fact accessed by many devices, vulnerabilities are more likely to be exploited.

Figure 7:
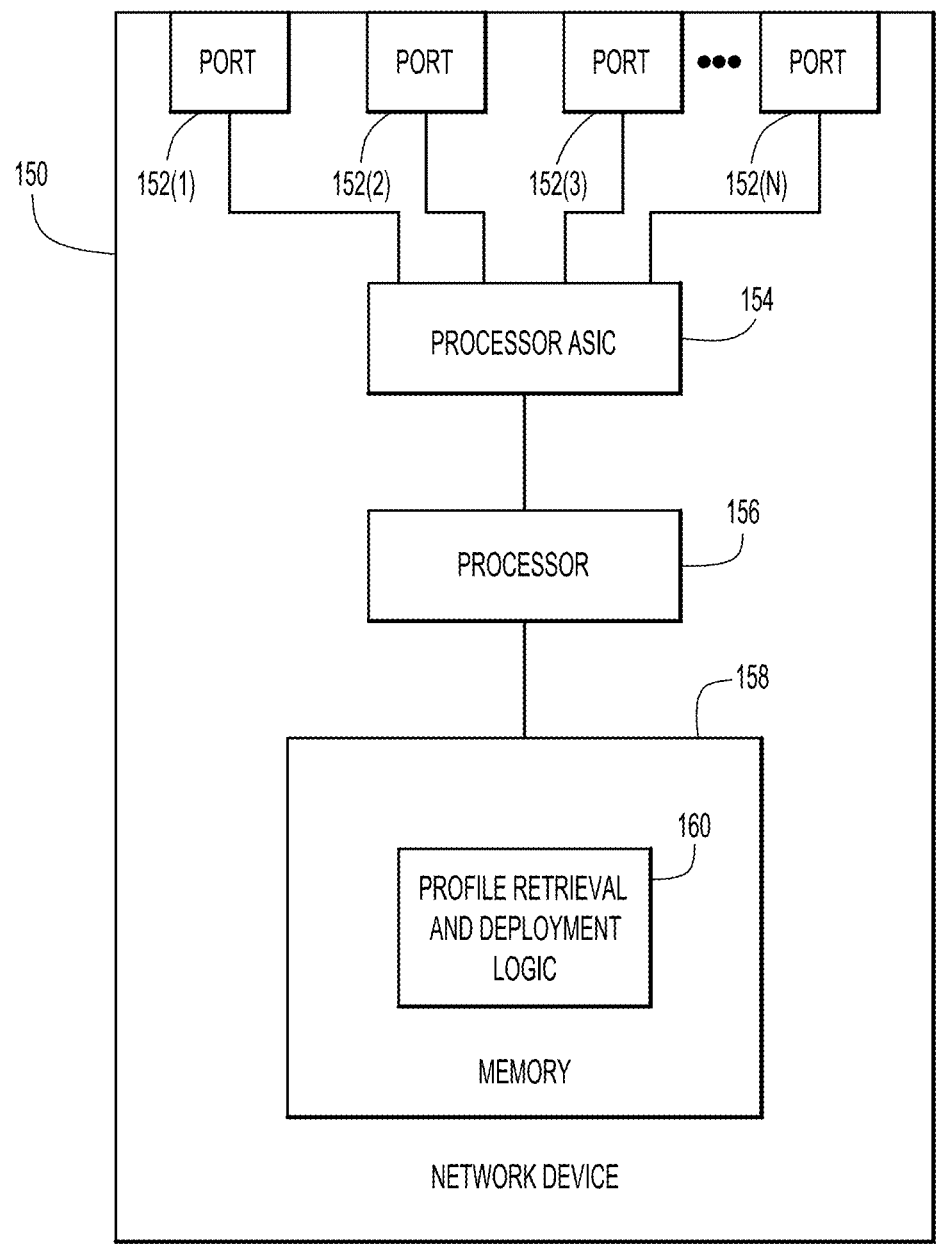
FIG. 7 is a block diagram of a network device configured to retrieve usage profiles associated with special purpose network connected devices, according to an example embodiment.
Figure 8:
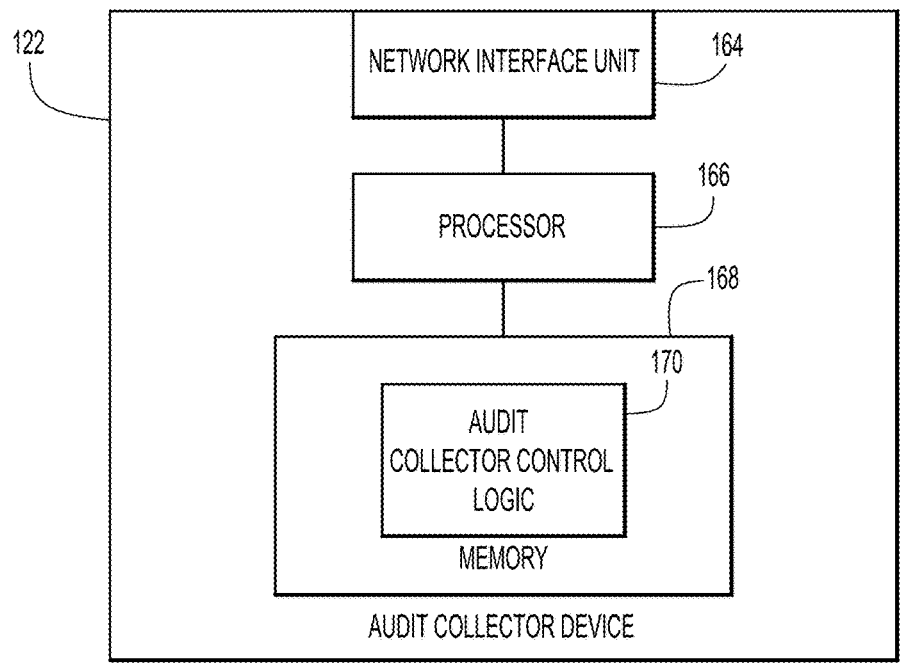
FIG. 8 is a block diagram of an audit collector device, according to an example embodiment.
Figure 9:
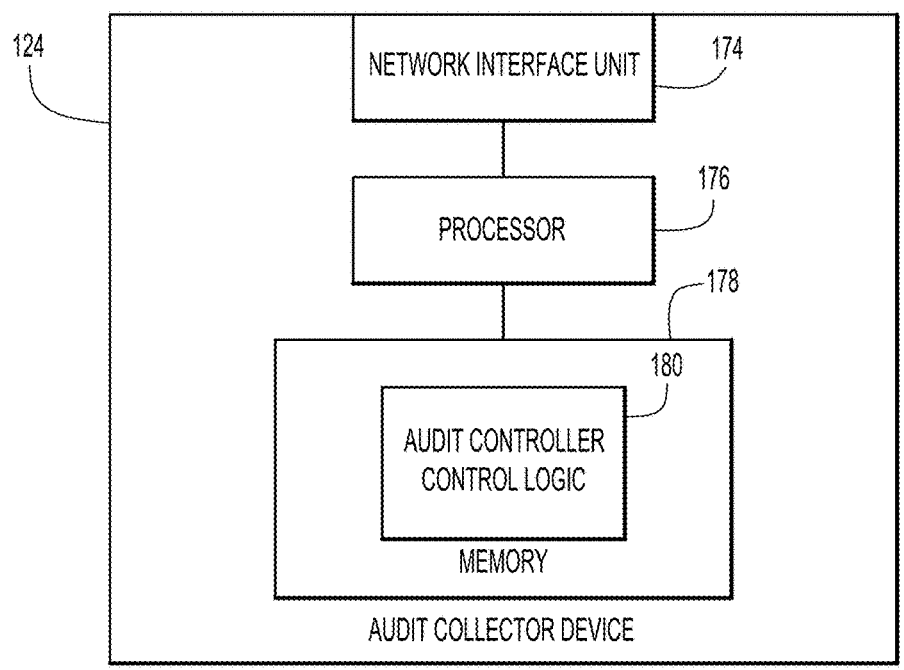
FIG. 9 is a block diagram of an audit controller, according to an example embodiment.

Reference is now made to FIGS. 7-9. FIG. 7 illustrates a block diagram of a network device 150 (e.g., a switch, a controller, or a security appliance (e.g., firewall, intrusion prevention device, etc.) that is configured to participate in the techniques presented herein. The network device 150 includes a network interface unit in the form of a plurality of network ports 152(1)-152(N), a processor Application Specific Integrated Circuit (ASIC) 154 that performs network processing functions, one or more processors 156 (e.g., microprocessors or microcontrollers), and memory 158. The memory 158 stores executable instructions for profile retrieval and deployment logic 160 which, when executed by the one or more processors 156, causes the one or more processors 156 to perform operations described herein on behalf of the network device 150. In particular, the policy retrieval and deployment logic 160 may be executed to, for example, retrieve a usage profile, instantiate usage descriptions, configure one or more network devices using the usage descriptions, etc. It is to also be understood that the network device 150 may be a virtual (software-based) appliance, in which case the profile retrieval and deployment logic 160 would be included as part of the software that is used to implement the virtual appliance.

The memory 158 may include read only memory (ROM), random access memory (RAM), magnetic disk storage media devices, optical storage media devices, flash memory devices, electrical, optical, or other physical/tangible memory storage devices. Thus, in general, the memory 158 may comprise one or more tangible (non-transitory) computer readable storage media (e.g., a memory device) encoded with software comprising computer executable instructions and when the software is executed (by the one or more processors 156) it is operable to perform the operations described herein.

FIGS. 8 and 9 are block diagrams of the audit collector 122 and the audit controller 124, respectively. Referring first to FIG. 8, the audit collector 122 is a computing or network device that includes a network interface unit 164 to enable network communications, one or more processors 166, and memory 168. The memory 168 stores executable instructions for audit collector control logic 170 that, when executed by the one or more processors 166, causes the one or more processors 166 to perform the operations described herein with reference to audit collector 122.

Referring next to FIG. 9, the audit controller 124 is a computing or network device that includes a network interface unit 174 to enable network communications, one or more processors 176, and memory 178. The memory 178 stores executable instructions for audit controller control logic 180 that, when executed by the one or more processors 176, causes the one or more processors 176 to perform the operations described herein with reference to audit controller 124.

The memory 168 and 178 shown in FIGS. 8 and 9, respectively, may include ROM, RAM, magnetic disk storage media devices, optical storage media devices, flash memory devices, electrical, optical, or other physical/tangible memory storage devices. Thus, in general, the memory 168 and 178 may each comprise one or more tangible (non-transitory) computer readable storage media (e.g., a memory device) encoded with software comprising computer executable instructions and when the software is executed (by the controller) it is operable to perform the operations described herein.

It is to be appreciated that the arrangements for the audit collector device 122 and the audit controller 124 shown in FIGS. 8 and 9, respectively, are examples and that the collector device 122 and the audit controller 124 may have different arrangement in accordance with alternative examples. For example, the audit collector device 122 and the audit controller 124 may be virtualized and embodied as software processes running in a cloud computing/data center environment. Furthermore, the audit collector device 122 and the audit controller 124 may be embodied as a single device that performs the audit collection and audit controller operations.

Figure 10:
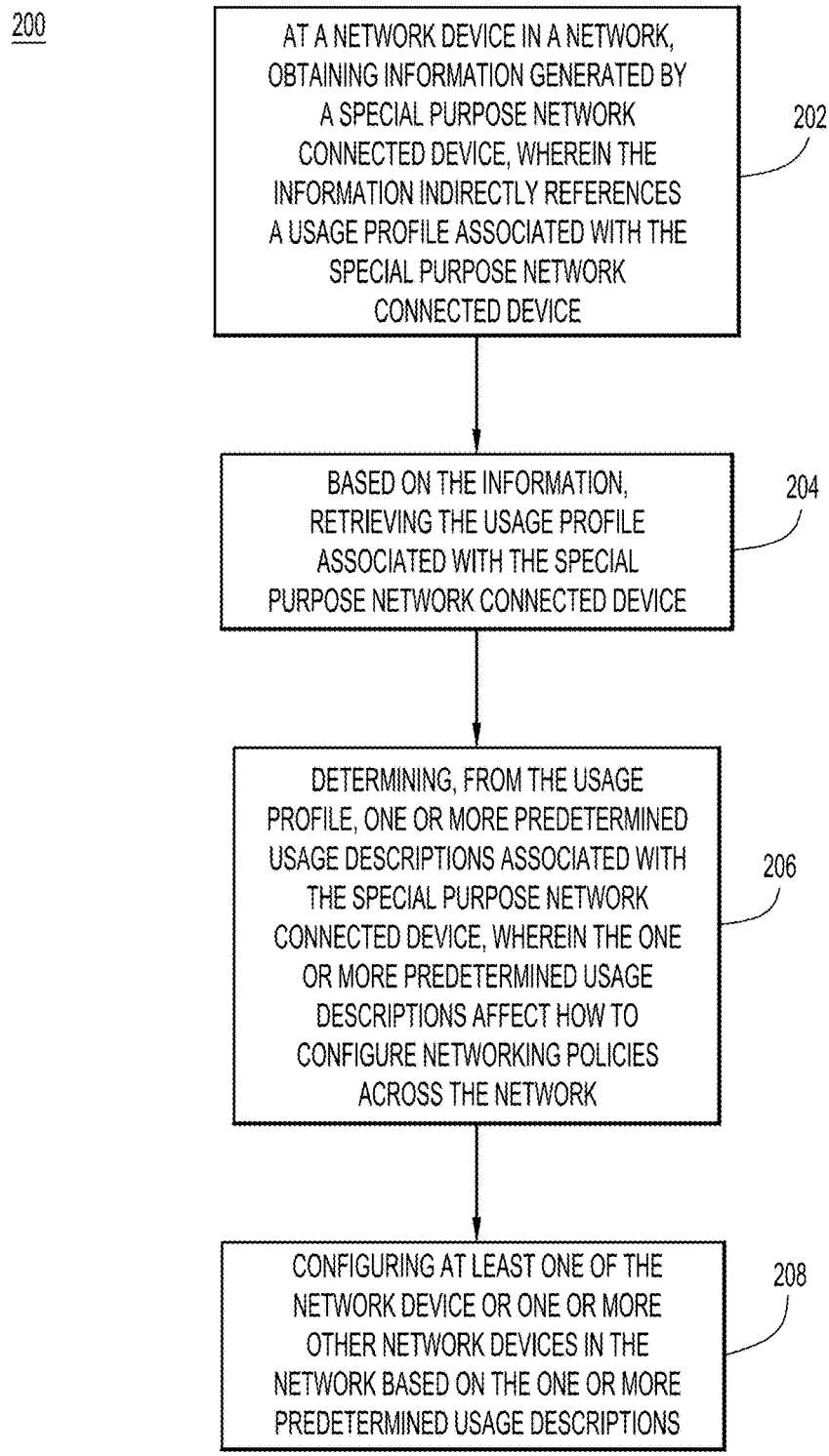
FIG. 10 is a flowchart of a method, according to an example embodiment.

FIG. 10 is a flowchart illustrating a method 200 in accordance with examples presented herein. Method 200 begins at 202 where a network device in a network obtains information generated by a special purpose network connected device which indirectly references a usage profile associated with the special purpose network connected device. At 204, based on the information, the network device retrieves the usage profile associated with the special purpose network connected device. At 206, the network device determines, from the usage profile, one or more predetermined usage descriptions associated with the special purpose network connected device. At 208, at least one of the network device or one or more other network devices in the network is configured based on the one or more predetermined usage descriptions extracted from the usage profile.

In one form, a method is provided comprising: at a network device in a network, obtaining information generated by a special purpose network connected device, wherein the information indirectly references a usage profile associated with the special purpose network connected device; based on the information, retrieving the usage profile associated with the special purpose network connected device; determining, from the usage profile, one or more predetermined usage descriptions associated with the special purpose network connected device, wherein the one or more predetermined usage descriptions affect how to configure networking policies across the network; and configuring at least one of the network device or one or more other network devices in the network based on the one or more predetermined usage descriptions.

In another form, an apparatus is provided comprising: one or more network interface ports enabled for communication on a network; a memory; and a processor configured to: obtain information generated by a special purpose network connected device that is connected to network, wherein the information indirectly references a usage profile associated with the special purpose network connected device, based on the information, retrieve the usage profile associated with the special purpose network connected device, determine, from the usage profile, one or more predetermined usage descriptions associated with the special purpose network connected device, wherein the one or more predetermined usage descriptions affect how to configure networking policies across the network, and initiate configuration of at least one of the network device or one or more other network devices in the network based on the one or more predetermined usage descriptions.

In another form, one or more non-transitory computer readable storage media are provided encoded with instructions that, when executed by a processor, cause the processor to: at a network device in a network, obtain information generated by a special purpose network connected device, wherein the information indirectly references a usage profile associated with the special purpose network connected device; based on the information, retrieve the usage profile associated with the special purpose network connected device; determine, from the usage profile, one or more predetermined usage descriptions associated with the special purpose network connected device, wherein the one or more predetermined usage descriptions affect how to configure networking policies across the network; and initiate configuration of at least one of the network device or one or more other network devices in the network based on the one or more predetermined usage descriptions.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a network device forming part of a network infrastructure:
following a connection of a special purpose network connected device to the network infrastructure, obtaining information generated by the special purpose network connected device, wherein the information indirectly references a usage profile associated with the special purpose network connected device;
based on the information, retrieving the usage profile associated with the special purpose network connected device;
determining, from the usage profile, one or more predetermined usage descriptions associated with the special purpose network connected device, wherein the one or more predetermined usage descriptions indicate a predetermined network access authorized for the special purpose network connected device, wherein the predetermined network access is determined prior to the connection of the special purpose network connected device to the network infrastructure;
extracting, from the usage profile, at least one predetermined usage description from among the one or more predetermined usage descriptions, the at least one predetermined usage description including an indication of one or more network management entities;
converting the at least one predetermined usage description into a network access policy and locally resolving the indication of the one or more network management entities by associating the network access policy with a local identifier of the special purpose network connected device; and
configuring the network infrastructure based on the network access policy in order to restrict network traffic associated with the special purpose network connected device.

2. The method of claim 1, wherein the information is a Uniform Resource Identifier sent as part of an announcement message generated by the special purpose network connected device, and wherein the method further comprises:
resolving the Uniform Resource Identifier to identify a storage location that includes the usage profile associated with the special purpose network connected device, and
propagating the network access policy to a plurality of other network devices forming the network infrastructure.

3. The method of claim 2, wherein the storage location is a website associated with a manufacturer of the special purpose network connected device.

4. The method of claim 1, wherein configuring the network infrastructure based on the predetermined network access comprises:
configuring at least one other network device in the network infrastructure to enforce access control policies, including the network access policy, on packets sent by the special purpose network connected device on the network infrastructure, and
wherein the one or more of the predetermined usage descriptions include information understood by the network device to provide configuration for the at least one other network device.

5. The method of claim 1, further comprising:
configuring one or more network devices in the network infrastructure to perform auditing operations on packets sent by the special purpose network connected device on the network infrastructure.

6. The method of claim 1, wherein the one or more predetermined usage descriptions comprise one or more manufacturer-based usage descriptions set by a manufacturer of the special purpose network connected device, wherein the manufacturer-based usage descriptions indicate an operational intent of the manufacturer for the special purpose network connected device.

7. The method of claim 1, wherein the information that indirectly references the usage profile associated with the special purpose network connected device comprises an identity of the special purpose network connected device, wherein the method further comprises:
using the identity of the special purpose network connected device to locate a stored Uniform Resource Identifier associated with the special purpose network connected device; and resolving the Uniform Resource Identifier to identify a location for the usage profile associated with the special purpose network connected device.

8. An apparatus comprising:
one or more network interface ports enabled for communication on a network infrastructure;
a memory; and
a processor configured to:
following connection of a special purpose network connected device to the network infrastructure, obtain information generated by the special purpose network connected device, wherein the information indirectly references a usage profile associated with the special purpose network connected device,
based on the information, retrieve the usage profile associated with the special purpose network connected device,
determine, from the usage profile, one or more predetermined usage descriptions associated with the special purpose network connected device, wherein the one or more predetermined usage descriptions indicate predetermined network access authorized for the special purpose network connected device, wherein the predetermined network access is determined prior to the connection of the special purpose network connected device to the network infrastructure,
extract, from the usage profile, at least one predetermined usage description from among the one or more predetermined usage descriptions, the at least one predetermined usage description including an indication of one or more network management entities;
convert the at least one predetermined usage description into a network access policy and locally resolve the indication of the one or more network management entities by associating the network access policy with a local identifier of the special purpose network connected device; and
initiate configuration of the network infrastructure based on the network access policy in order to restrict network traffic associated with the special purpose network connected device.

9. The apparatus of claim 8, wherein the information is a Uniform Resource Identifier sent as part of an announcement message generated by the special purpose network connected device, and wherein the processor is further configured to:
resolve the Uniform Resource Identifier to identify a storage location that includes the usage profile associated with the special purpose network connected device, and
propagating the network access policy to a plurality of other network devices forming the network infrastructure.

10. The apparatus of claim 9, wherein the storage location is a website associated with a manufacturer of the special purpose network connected device.

11. The apparatus of claim 8, wherein to initiate configuration of the network infrastructure based on the predetermined network access, the processor is configured to:
initiate configuration of at least one other network device in the network infrastructure to enforce access control policies, including the network access policy, on packets sent by the special purpose network connected device on the network infrastructure, and
wherein the one or more of the predetermined usage descriptions include information understood by the apparatus to provide configuration for the at least one other network device.

12. The apparatus of claim 8, wherein the processor is configured to:
initiate configuration of one or more network devices in the network infrastructure to perform auditing operations on packets sent by the special purpose network connected device on the network infrastructure.

13. The apparatus of claim 8, wherein the one or more predetermined usage descriptions comprise one or more manufacturer-based usage descriptions set by a manufacturer of the special purpose network connected device, and wherein the manufacturer-based usage descriptions indicate an operational intent of the manufacturer for the special purpose network connected device.

14. The apparatus of claim 8, wherein the information that indirectly references the usage profile associated with the special purpose network connected device comprises an identity of the special purpose network connected device, and wherein the processor is configured to:
use the identity of the special purpose network connected device to locate a stored Uniform Resource Identifier associated with the special purpose network connected device; and
resolve the Uniform Resource Identifier to identify a location for the usage profile associated with the special purpose network connected device.

15. One or more non-transitory computer readable storage media encoded with instructions that, when executed by a processor of a network device associated with a network infrastructure, cause the processor to:
following connection of a special purpose network connected device to the network infrastructure, obtain information generated by the special purpose network connected device connected to the network infrastructure, wherein the information indirectly references a usage profile associated with the special purpose network connected device;
based on the information, retrieve the usage profile associated with the special purpose network connected device;
determine, from the usage profile, one or more predetermined usage descriptions associated with the special purpose network connected device, wherein the one or more predetermined usage descriptions indicate predetermined network access authorized for the special purpose network connected device, wherein the predetermined network access is determined prior to the connection of the special purpose network connected device to the network infrastructure;
extract, from the usage profile, at least one predetermined usage description from among the one or more predetermined usage descriptions, the at least one predetermined usage description including an indication of one or more network management entities;
convert the at least one predetermined usage description into a network access policy and locally resolve the indication of the one or more network management entities by associating the network access policy with a local identifier of the special purpose network connected device; and
initiate configuration of the network infrastructure based on the network access policy in order to restrict network traffic associated with the special purpose network connected device.

16. The non-transitory computer readable storage media of claim 15, wherein the information is a Uniform Resource Identifier sent as part of an announcement message generated by the special purpose network connected device, and wherein the non-transitory computer readable storage media further comprises instructions operable to:
resolve the Uniform Resource Identifier to identify a storage location that includes the usage profile associated with the special purpose network connected device.

17. The non-transitory computer readable storage media of claim 16, wherein the storage location is a website associated with a manufacturer of the special purpose network connected device, and wherein the network access policy is propagated to a plurality of network devices forming the network infrastructure.

18. The non-transitory computer readable storage media of claim 15, wherein the instructions operable to initiate configuration of the network infrastructure based on the predetermined network access comprise instructions operable to:
initiate configuration of the network infrastructure to enforce access control policies, including the network access policy, on packets sent by the special purpose network connected device on the network infrastructure.

19. The non-transitory computer readable storage media of claim 15, further comprising instructions operable to:
initiate configuration of one or more network devices in the network infrastructure to perform auditing operations on packets sent by the special purpose network connected device on the network infrastructure,
wherein the one or more of the predetermined usage descriptions include information understood by the network device to provide configuration for at least one other network device.

20. The non-transitory computer readable storage media of claim 15, wherein the one or more predetermined usage descriptions comprise one or more manufacturer-based usage descriptions set by a manufacturer of the special purpose network connected device, wherein the manufacturer-based usage descriptions indicate an operational intent of the manufacturer for the special purpose network connected device.

* * * * *